United States Patent
Nguyen et al.

(10) Patent No.: US 11,851,608 B2
(45) Date of Patent: Dec. 26, 2023

(54) COMPOSITIONS AND METHODS FOR DEEP PENETRATION TREATMENTS OF FINES MIGRATION AND SAND CONTROL IN CLAY-LADEN FORMATIONS

(71) Applicant: Halliburton Energy Services, Inc., Houston, TX (US)

(72) Inventors: Philip D. Nguyen, Houston, TX (US); Michael Wayne Sanders, Houston, TX (US); Josselyne Chano, Houston, TX (US); Philippe Quero, Houston, TX (US); Julio Estuardo Vasquez Estrada, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 58 days.

(21) Appl. No.: 17/549,760

(22) Filed: Dec. 13, 2021

(65) Prior Publication Data
US 2023/0183555 A1    Jun. 15, 2023

(51) Int. Cl.
*C09K 8/38*        (2006.01)
*C09K 8/57*        (2006.01)
*C09K 8/575*       (2006.01)

(52) U.S. Cl.
CPC ............... *C09K 8/572* (2013.01); *C09K 8/38* (2013.01); *C09K 8/5751* (2013.01)

(58) Field of Classification Search
CPC ......... C09K 8/572; C09K 8/38; C09K 8/5751
See application file for complete search history.

(56) References Cited

U.S. PATENT DOCUMENTS

| | | | |
|---|---|---|---|
| 4,478,962 A | 10/1984 | Woodson | |
| 4,800,960 A | 1/1989 | Friedman et al. | |
| 5,199,490 A | 4/1993 | Surles et al. | |
| 5,486,557 A | 1/1996 | Akerberg | |
| 5,604,184 A | 2/1997 | Ellis et al. | |
| 5,692,566 A * | 12/1997 | Surles ................. | C09K 8/5086 166/295 |
| 5,703,144 A | 12/1997 | Akerberg | |
| 6,177,484 B1 | 1/2001 | Surles | |
| 7,766,099 B2 | 8/2010 | Nguyen | |
| 8,167,045 B2 | 5/2012 | Nguyen et al. | |
| 2006/0243442 A1 * | 11/2006 | Nguyen ............... | C09K 8/5751 166/295 |
| 2009/0205830 A1 * | 8/2009 | Nguyen ................ | C09K 8/508 166/295 |
| 2012/0178651 A1 * | 7/2012 | Huang .................. | C09K 8/845 977/773 |

* cited by examiner

*Primary Examiner* — Alicia Bland
(74) *Attorney, Agent, or Firm* — Thomas Rooney; C. Tumey Law Group PLLC

(57) ABSTRACT

A method may include: introducing a treatment fluid into a subterranean formation, the treatment fluid comprising: an aqueous brine; and a hydrolysable resin precursor; allowing the hydrolysable resin precursor to hydrolyze in the subterranean formation to form at least a polymerizable resin precursor monomer; and allowing the polymerizable resin precursor monomer to polymerize to form a polymerized resin in the subterranean formation.

19 Claims, 2 Drawing Sheets

COMPOSITIONS AND METHODS FOR DEEP PENETRATION TREATMENTS OF FINES MIGRATION AND SAND CONTROL IN CLAY-LADEN FORMATIONS

BACKGROUND

Fines migration and sand production from completed wells is a continual challenge in the oilfield. There are several wellbore operations such as gravel packing, frac-packing, and standalone screens that are used to mitigate fines migration and sand production. While there are some formation types that respond well to these fines migration techniques, sand control techniques in low-permeability formations and clay-laden formations are often not adequate to address the production of fines. Solvent containing resin treatment fluids such as epoxy-based and furan-based resins have been used to control sand production. However, the cost and complexity of placing these treatment fluids especially in long treatment intervals such as in horizontal applications can render resin treatment fluids unsuitable for some applications. Further, there is difficulty in placing the resin treatment fluids in relatively low permeability formations such as those formations with high clay content due to the viscosity of the resin treatment fluids. The producing formation adjacent to the wellbore requires a relatively high consolidation strength to prevent sand production, whereas the formation a distance away from the wellbore only requires low levels of consolidation to control fines migration. As production intervals become longer, the placement distribution of interval length becomes more difficult, since most of the solvent-based resins cannot be foamed which can help divert the fluid across the interval.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
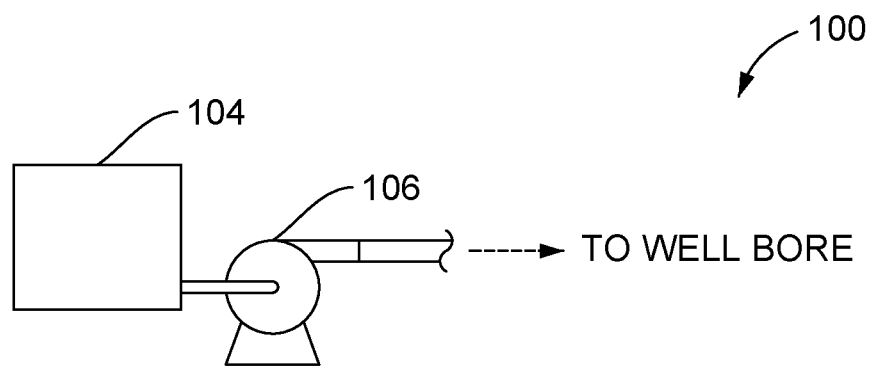
FIG. 1 is a schematic illustration of an example system for the preparation and delivery of a resin treatment fluid into a wellbore.

The present disclosure may relate to aqueous-based resin treatment fluids, and more particularly to methods, compositions, and systems using the aqueous-based resin treatment fluids for controlling fines migration, sand production, near wellbore consolidation, and proppant flowback control in low permeability formations and clay-laden formations. The aqueous-based resin treatment fluid may include an aqueous brine and a hydrolysable resin precursor. A concentration of the hydrolysable resin precursor in the aqueous-based resin treatment fluid can be adjusted for different applications to provide varying levels of cohesion and/or consolidation strength to lock particulates in place and overcome the high fluid drag forces as a result of high flow rates in a producing well.

In embodiments, the aqueous-based resin treatment fluid may be introduced into a subterranean formation where the hydrolysable resin precursor may react with water in the aqueous-based resin treatment fluid to form a polymerizable resin precursor monomer and a polymerization initiator. One particular advantage of the hydrolysable resin precursor of the present application is that the hydrolysis reaction produces the initiator required for the polymerizable resin precursor monomer to polymerize to form a polymerized resin. One the hydrolysis reaction produces the polymerizable resin precursor monomer and polymerization initiator, the polymerizable resin precursor monomer may then polymerize to form a hardened mass and at least partially consolidate an interval in a subterranean formation. The generation of the polymerizable resin precursor monomer in situ within a subterranean formation may allow the polymerizable resin precursor monomer penetrate deeper into the formation than if the polymerizable resin precursor monomer was introduced directly into the formation or a wellbore penetrating at least a portion of the formation. Additionally, in some embodiments, the methods and compositions of the present disclosure may provide improved uniform placement of the polymerizable resin precursor monomer in the subterranean formation. For example, an entire interval in the subterranean formation may be evenly soaked with a polymerizable resin precursor monomer as opposed to spot placement of polymerizable resin precursor monomer.

The aqueous-based resin treatment fluid is self-activated by hydrolysis with temperature and time to transform the hydrolysable resin precursor into the polymerizable resin precursor monomer and a polymerization initiator. Since the hydrolysis reaction proceeds slowly at ambient temperatures, the hydrolysable resin precursor is stable at well pad conditions and only becomes sufficiently activated to form the polymerizable resin precursor monomer when exposed to elevated temperatures in the subterranean formation. The aqueous-based resin treatment fluid of the present disclosure may have several advantages over solvent containing resin treatment fluids such as epoxy-based and furan-based resins, only some of which may be described herein. The aqueous-based resin treatment fluid containing the hydrolysable resin precursor may be stored as one liquid additive at a well pad site which reduces the storage and mixing complexity associated with epoxy and furan resins which typically require a resin and a hardener to be stored separately and mixed before introduction into a subterranean formation. Further, the hydrolysable resin precursor is dispersible in aqueous fluids such as brines whereas epoxy and furan resins typically require an oleaginous solvent acting as a diluent or a carrier to decrease their viscosities.

The aqueous-based resin treatment fluid that comprise the hydrolysable resin precursor may have a lower viscosity than some conventional consolidating agents. In addition, the hydrolysable resin precursor have a smaller molecular structure than epoxy and furan resins. This low viscosity and small molecular structure may allow deeper penetration of the aqueous-based resin treatment fluid into the subterranean formation, thus consolidating a deeper portion of the subterranean formation. Furthermore, the aqueous-based resin treatment fluids of the present invention which polymerize in situ form an ultra-thin coating on formation particulates which consolidate the particulates without unnecessary blockage of flow paths through the formation. In some embodiments, the aqueous-based resin treatment fluid of the present invention are substantially free of resins that are not dispersible in water, for example, an epoxy-based resin.

The aqueous-based resin treatment fluid that are used in accordance with the present disclosure generally include hydrolysable resin precursor dispersed and/or dissolved in an aqueous brine. Accordingly, in exemplary embodiments, the aqueous-based resin treatment fluid is substantially free of emulsion droplets or particles. The substantial absence of emulsion droplets (e.g., internal resin droplets) may be beneficial, because such droplets typically have a diameter of about 1 to about 5 microns and tend to plug pore spaces that are about 10 microns wide or less, thereby decreasing the permeability of the formation. The amount of hydrolysable resin precursor used in the aqueous-based resin treatment fluid may depend on the type of treatment application in which the aqueous-based resin treatment fluid is used, and the temperature of the subterranean formation where it is used.

One example of a hydrolysable resin precursor includes furfuryl acetate. Furfuryl acetate hydrolyzes with water to produce furfuryl alcohol and acetic acid as shown in Equation 1. The furfuryl alcohol is catalyzed by the acetic acid to undergo a condensation reaction to form poly(furfuryl alcohol) resin as shown by Equation 2. Other suitable hydrolysable resin precursors may further include, without limitation, furfuryl acetate, furfuryl methanoate, furfuryl propanoate, furfuryl butanoate, furfuryl pentanoate, furfuryl hexanoate, furfuryl heptanoate, 5-methylfurfuryl acetate, furoic acid, methyl furoate, ethyl furoate, propyl furoate, hexyl furoate, and combinations thereof. The hydrolysable resin precursor may be present in the aqueous-based resin treatment fluid in any suitable amount, including from about 0.1% v/v to about 25% v/v of the aqueous-based resin treatment fluid. Alternatively, the hydrolysable resin precursor may be present in the aqueous-based resin treatment fluid in an amount of about 0.1% v/v to about 0.3% v/v, about 0.1% v/v to about 0.5% v/v, about 0.1% v/v to about 0.8% v/v, about 0.1% v/v to about 1.0% v/v, about 1.0% v/v to about 1.5% v/v, about 1.5% v/v to about 2.0% v/v, about 2.0% v/v to about 3.0% v/v, about 3.0% v/v to about 5.0% v/v, about 5.0% v/v to about 7.0% v/v, about 7.0% v/v to about 10.0% v/v, about 10.0% v/v to about 15.0% v/v, about 15.0% v/v to about 25% v/v, or any ranges therebetween.

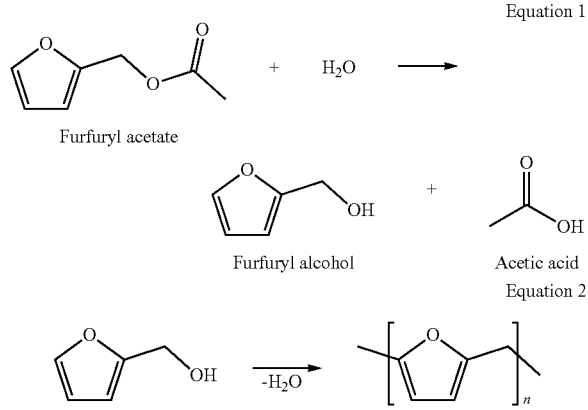

Equation 1

Furfuryl acetate

Furfuryl alcohol        Acetic acid

Equation 2

The aqueous-based resin treatment fluid may include an aqueous brine as a base fluid. Aqueous brines include mixtures of one or more salts dissolved in water where the salt is present in an amount of about 1 wt. % or more. While brines can be saturated, the term brine is used generally herein to reference water containing one or more salts in solution, including seawater or salt waters. The aqueous brine may include, for example, produced brine, seawater, or another water source, such as freshwater or tap water, with added salt. In some embodiments, the brine can include more salt than typical seawater, for example, more than 35 parts per thousand by weight. Examples of suitable salts in the brines include dissolved ions of group I and group II elements as well as ammonium salts, such as sodium chloride, calcium chloride, potassium chloride, potassium carbonate, ammonium chloride, sodium carbonate, potassium carbonate, and combinations thereof. Examples of suitable aqueous brines may include, but are not limited to 2% KCl, 7% KCl, 6% NaCl, and 5% NH$_4$Cl. Brines may be particularly useful in clay-laden formations where clay swelling, and subsequent migration can reduce formation permeability. The aqueous-based resin treatment fluids described herein are particularly suited for subterranean formations that include clay as the brine-based fluids have reduced capacity to swell clays as compared to non-brine aqueous fluids. The particle salt selected for the brine may be dependent on a number of factors, including cost, availability, and desired density, among others.

The polymerizable resin precursor monomer may polymerize in response to activation by an initiator compound, such as acetic acid in the case of furfuryl acetate or may self-polymerize at elevated temperatures. In general, if the aqueous-based resin treatment fluid is introduced to a subterranean formation having a bottomhole temperature of about 60° F. (15° C.) or 250° F. (121° C.) or higher, no initiator compound is necessary to activate polymerization of the polymerizable resin precursor monomer. In some embodiments, in which a subterranean formation has a bottomhole temperature less than about 250° F. (121° C.), an initiator compound may be included in the aqueous-based resin treatment fluid to initiate polymerization of the polymerizable resin precursor monomer. Initiator compounds may include, without limitation, organic acids, inorganic acids, acid anhydrides, water soluble multivalent metal salts, and combinations thereof. Some initiator compounds that may be used are acid initiator compounds. Examples of organic acids and acid anhydrides that may be suitable initiator compounds include maleic anhydride, phthalic anhydride, maleic acid, malic acid, phthalic acid, trichloroacetic acid, formic acid, oxalic acid, oxalic anhydride, pyromellitic dianhydride, dodecynyl succinic anhydride, hexahydrophthalic anhydride benzoic trichloride, hexachloroacetone, sodium trichloroacetate, sodium trifluoroacetate, and combinations thereof. A water-soluble multivalent metal salt may comprise at least one of the following: a manganese ion, a zinc ion, a cadmium ion, a magnesium ion, a cobalt ion, a nickel ion, an iron ion, a lead ion, a calcium ion, a copper ion, and a tin ion. Suitable initiator compounds may also include delay acting initiator compounds. Examples of delay acting initiator compounds that may be suitable include block acids such as sulfonic acid, sulfamic acid, glycolic acid, and certain esters which are delay-acting catalysts, i.e., esters that slowly hydrolyze to release an acid that acts as an initiator compound. Examples of oil soluble initiators include dinonylnaphthalene disulfonic acid, alkylnaphthalene disulfonic acid, phosphoric acid, phthaloyl chloride, and phthalic anhydride. An initiator compounded may be included in the aqueous-based resin treatment fluid or be introduced into the subterranean formation separately from the aqueous-based resin treatment fluid such as by a fluid pill. In some embodiments, an initiator compound may be included in the aqueous-based resin treatment fluid in a range of from about 0.1 wt. % to about 25 wt. % by weight of the aqueous-based resin treatment fluid. Alternatively, the initiator compound may be present in the aqueous-based resin treatment fluid in an amount of about 0.1% wt. % to about 0.3% wt. %, about 0.1% wt. % to about 0.5% wt. %, about 0.1% wt. % to about 0.8% wt. %, about 0.1% wt. % to about 1.0% wt. %, about 1.0% wt. % to about 1.5% wt. %, about 1.5% wt. % to about 2.0% wt. %, about 2.0% wt. % to about 3.0% wt. %, about 3.0% wt. % to about 5.0% wt. %, about 5.0% wt. % to about 7.0% wt. %, about 7.0% v/v to about 10.0% v/v, about 10.0% v/v to about 15.0% v/v, about 15.0% v/v to about 25% v/v, or any ranges therebetween.

The aqueous-based resin treatment fluid may further include a silane coupling agent. The silane coupling agent may be used, among other things, to act as a mediator to help bond the resin to the surface of the subterranean formation, and/or the surface of the wellbore. Examples of suitable silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyltriethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; and combinations thereof. The silane coupling agent may be present in the aqueous-based resin treatment fluid in any suitable amount, including from about 0.1% v/v to about 5% v/v of the aqueous-based resin treatment fluid. Alternatively, the silane coupling agent may be present in the aqueous-based resin treatment fluid in an amount of about 0.1% v/v to about 0.3% v/v, about 0.1% v/v to about 0.5% v/v, about 0.1% v/v to about 0.8% v/v, about 0.1% v/v to about 1.0% v/v, about 1.0% v/v to about 1.5% v/v, about 1.5% v/v to about 2.0% v/v, about 2.0% v/v to about 3.0% v/v, about 3.0% v/v to about 5.0% v/v, or any ranges therebetween.

The aqueous-based resin treatment fluid may further include a surfactant which facilitates the coating of the hydrolysable resin precursor or polymerizable resin precursor monomer onto particulates in the subterranean formation. Examples of suitable surfactants include, but are not limited to, alkyl phosphonate surfactants (e.g., a $C_{12}$-$C_{22}$ alkyl phosphonate surfactant), ethoxylated nonyl phenol phosphonate esters, ethoxylated $C_{12}$-$C_{22}$ diamine, ethoxylated $C_{12}$-$C_{22}$ triamine, ethoxylated $C_{12}$-$C_{22}$ tetraamine, ethoxylated $C_{12}$-$C_{22}$ diamine methylchloride quat, ethoxylated $C_{12}$-$C_{22}$ triamine methylchloride quat, ethoxylated $C_{12}$-$C_{22}$ tetraamine methylchloride quat, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine DDBSA (dodecyl benzene sulfonic acid) salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quat, heptamethylated $C_{12}$-$C_{22}$ diamine quat, nonamethylated $C_{12}$-$C_{22}$ diamine quat, and combinations thereof. The silane surfactant may be present in the aqueous-based resin treatment fluid in any suitable amount, including from about 0.1% v/v to about 5% v/v of the aqueous-based resin treatment fluid. Alternatively, the surfactant may be present in the aqueous-based resin treatment fluid in an amount of about 0.1% v/v to about 0.3% v/v, about 0.1% v/v to about 0.5% v/v, about 0.1% v/v to about 0.8% v/v, about 0.1% v/v to about 1.0% v/v, about 1.0% v/v to about 1.5% v/v, about 1.5% v/v to about 2.0% v/v, about 2.0% v/v to about 3.0% v/v, about 3.0% v/v to about 5.0% v/v, or any ranges therebetween.

In embodiments, the aqueous-based resin treatment fluid may be used in conjunction with pre-flush and post-flush treatments when introducing the aqueous-based resin treatment fluid into a subterranean formation. For example, a pre-flush fluid including a brine and an oil-wetting surfactant as described above may be introduced to the subterranean formation before the aqueous-based resin treatment fluid including the hydrolysable resin precursor. The surfactant may condition a surface of the formation to prepare the formation for coating with the polymerizable resin precursor monomer. In further embodiments, the aqueous-based resin treatment fluid may be followed by introduction of a post-flush fluid into the subterranean formation. The post-flush fluid may include a gas, such as nitrogen or carbon dioxide, a hydrocarbon-based fluid such as diesel, kerosene, and hydrotreated distillate, brines as described above, and aqueous based fluids such as a brine and surfactant. In some embodiments, a post-flush fluid may be used to displace the aqueous-based resin treatment fluid from the pore channels of the subterranean formation and to force the aqueous-based resin treatment fluid further into the subterranean formation. In some embodiments the post-flush fluid is placed into the subterranean formation at a matrix flow rate such that the aqueous-based resin treatment fluid is displaced from the pore spaces but is not displaced from its contact points between the subterranean formation particulates such as fines and sand particles.

In further embodiments, the aqueous-based resin treatment fluid, pre-flush fluid, and/or post-flush fluid may further include a foaming agent, including the foam generating surfactants previously described, and a foaming gas to produce a foamed fluid. In some embodiments, the pre-flush fluid is foamed to, inter alia, provide enhanced placement of the pre-flush fluid and the aqueous-based resin treatment fluid to be injected following the pre-flush fluid, and/or to reduce the amount of aqueous base fluid that may be required, e.g. in water-sensitive subterranean formations such as those which contain water swellable clays. Various gases can be utilized for foaming the fluids of the present disclosure, including, but not limited to, nitrogen, carbon dioxide, air, and methane, and combinations thereof. In some embodiments, the foaming gas may be present in the foamed fluids in an amount in the range of about 5% to about 98% by volume of the foamed fluids.

In further examples the aqueous-based resin treatment fluid may include additional additives such as clay stabilizers, oxygen scavengers, corrosion inhibitors, scale inhibitors, iron control agents, antifoam agents, dispersants, viscosifiers, weighting agents, wetting agents, coating enhancement agents, and combinations thereof. The aqueous-based resin treatment may further comprise a stabilizer such as sodium tetraborate decahydrate or lignosulfonic acid to stabilize the dispersion and/or dissolution of hydrolysable resin precursor or polymerizable resin precursor monomer in the aqueous-based resin treatment fluid.

The aqueous-based resin treatment fluid may be prepared or provided in any suitable manner. For example, the components of the aqueous-based resin treatment fluid may be pre-mixed to form a treatment fluid at an offsite location and be transported to a well pad whereby the aqueous-based resin treatment fluid may be introduced into a subterranean formation. In some examples, one or more of the various components of the aqueous-based resin treatment fluid may be prepared "on-the-fly." The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. For example, aqueous-based resin treatment fluid may be prepared by continuously combining (a) a brine with (b) a liquid that comprises hydrolysable resin precursor, an organosilane coupling agent, and a surfactant. As these two liquids are continuously combined, the resultant mixture is pumped into a subterranean formation. Furthermore, in some embodiments, one or more of the various treatment fluids used in connection with the present invention may be batch mixed. For example, an aqueous-based resin treatment fluid may be prepared by batch mixing a brine, hydrolysable resin precursor, an organo-silane coupling agent, and a surfactant.

The aqueous-based resin treatment fluid may be used in connection with a variety of subterranean treatments. For example, in remedial applications after a fracturing treatment or a gravel pack treatment has been performed, an aqueous-based resin treatment fluid may be introduced into an unconsolidated portion of a subterranean formation to stabilize particulates within the unconsolidated portion. The aqueous-based resin treatment fluid may disperse any loose fines within a proppant pack in a fracture, moving the fines away from the fracture (or near well bore area) and locking them in place. In exemplary embodiments, this may result in fines stabilization without damaging the permeability of the formation. The aqueous-based resin treatment fluid may stabilize gravel particulates around a screen and formation sand and fines particulates surrounding the well bore to remediate a screen failure. In addition to remedial treatments, an aqueous-based resin treatment fluid may be introduced to a subterranean formation as part of a pre-pad fluid in a gravel packing treatment, frac-packing treatment, or extension-pack treatment or hydraulic fracturing treatment. Additionally, the aqueous-based resin treatment fluid may be used in the treatment of a formation following an acid treatment, e.g., to stabilize the near-well bore region of the formation, the part of the formation surrounding the wormholes or channels created by the acid treatment, and/or the fracture faces of the formation. Examples embodiments in which the aqueous-based resin treatment fluid may be used in combination with one or more other subterranean treatments include using a polymerizable treatment fluid to stabilize and consolidate proppant particulates that are present in a fracture created during a fracturing operation, and/or using the aqueous-based resin treatment fluid to treat a formation before gravel packing. The portion of the subterranean formation to which the aqueous-based resin treatment fluid is introduced may be in or near a fracture in a subterranean formation, for example, a fracture which was created during a fracturing operation and which comprises proppant particulates. The polymerization of the aqueous-based resin treatment fluid may stabilize the proppant particulates in the fracture and reduce migration of the proppant from the fracture. The aqueous-based resin treatment fluid of may be introduced into a portion of a subterranean formation as part of a pre-pack procedure before a gravel packing treatment is conducted. The aqueous-based resin treatment fluid is allowed to at least partially polymerize before the gravel packing job is complete. This may have the advantage of consolidating relatively unconsolidated particulates and solids to prevent particulate migration into the gravel pack.

In some embodiments, after the aqueous-based resin treatment fluid is introduced into the subterranean formation, the wellbore may be shut in for a period of time to allow the hydrolysis of the hydrolysable resin precursor to form the polymerizable resin precursor monomer and cure to form a hardened resin. The shut-in period may be dependent upon the type of formation (mineralogy, clay content, etc.), formation temperature, and choice of hydrolysable resin precursor, for example. In general, a shut-in period may be executed for a period of about 1 hour to about 1 week. Alternatively, from about 1 hour to about 1 day, about 1 day to about 2 days, or about 1 day to about 1 week, for example.

In an example method, an aqueous-based resin treatment fluid may include an aqueous brine, hydrolysable resin precursor, an oil-wetting surfactant, and a silane coupling agent may be introduced into a wellbore. A method of controlling fines migration may include introducing a first aqueous treatment fluid comprising a brine and an oil-wetting surfactant into a subterranean formation surrounding a wellbore as a pre-flush treatment fluid to precondition the surfaces of subterranean formation particulates for accepting the aqueous-based resin treatment fluid. Thereafter, the aqueous-based resin treatment fluid including the aqueous brine, hydrolysable resin precursor, oil-wetting surfactant, and silane coupling agent is introduced into the subterranean formation and allowed to contact particulates in a near-wellbore area. Thereafter, a third aqueous treatment fluid including a brine is introduced into the wellbore to displace the aqueous-based resin treatment fluid to the top of perforation of the top perforated interval in the wellbore. Then, the wellbore may be shut in for a period of time to allow for the formation of the resin as described above to transform the poorly consolidated fines/sand into permeable, competent mass to lock formation particulates in place during well production.

In another example method, a method of controlling fines migration and formation sand production includes the following steps. Injecting a first aqueous treatment fluid including a brine and an oil-wetting surfactant into a formation surrounding a wellbore as a pre-flush treatment fluid to precondition the surfaces of formation particulates for accepting the coating of subsequent introduction of an aqueous-based resin treatment fluid. Then, injecting an aqueous-based resin treatment fluid including a brine, an oil wetting surfactant, a silane coupling agent, and a first concentration hydrolysable resin precursor into the wellbore to coat formation particulates near the wellbore. Then, injecting a third aqueous treatment fluid comprising a brine, an oil wetting surfactant, a silane coupling agent, and a second concentration of hydrolysable resin precursor, wherein the second concentration of hydrolysable resin precursor is 5 to 10 times the first concentration of hydrolysable resin precursor. Then, injecting a fourth aqueous treatment fluid comprising a brine to displace the third aqueous treatment fluid to the top of perforation of the top perforated interval and allowing the treated interval to shut in for a period of time depending on the bottomhole temperature of the well for curing of the hydrolysable resin precursor and transforming the poorly consolidated fines/sand into permeable, competent mass to lock formation particulates in place during well production.

In another example method, a method of controlling fines migration, sand production, and proppant (frac sand) flowback may include the following steps. First, injecting a first aqueous treatment fluid comprising a brine and an oil-wetting surfactant into a propped fracture and formation surrounding the wellbore as a pre-flush treatment fluid to precondition the surfaces proppant and formation particulates for accepting the coating of subsequent treatment fluids containing hydrolysable resin precursor. Second, injecting a second aqueous treatment fluid comprising a brine, an oil wetting surfactant, a silane coupling agent, and a first concentration of hydrolysable resin precursor for treating the proppant and formation particulates near the wellbore. Third, injecting a third aqueous treatment fluid comprising a brine, an oil wetting surfactant, a silane coupling agent, and a second concentration of hydrolysable resin precursor, wherein the second concentration of hydrolysable resin precursor is 5 to 10 times the first concentration of hydrolysable resin precursor. Then, injecting a fourth aqueous treatment fluid comprising a brine to displace the third aqueous treatment fluid to the top of perforation of the top perforated interval and allowing the treated interval to shut in for a period of time depending on the bottomhole temperature of the well for curing of curable agent and transforming the loose proppant pack and poorly consolidated fines/sand into permeable, competent masses to lock the proppant and formation particulates in place during well production.

In another example method, a method of controlling proppant (frac sand) flowback from one or more propped fractures may include the following steps. First, injecting a first aqueous treatment fluid including a brine and an oil-wetting surfactant into a propped fractures as a pre-flush treatment fluid to precondition the surfaces proppant particulates for accepting the coating of subsequent treatment fluid containing hydrolysable resin precursor. Then, injecting a second aqueous treatment fluid including a brine, an oil wetting surfactant, a silane coupling agent, and a hydrolysable resin precursor for treating the proppant particulates a distance in the propped fractures. Then, injecting a third aqueous treatment fluid including a brine to displace the second aqueous treatment fluid to the top of perforation of the top perforated interval and allowing the treated interval to shut in for a period of time depending on the bottomhole temperature of the well for curing of curable agent and transforming the loose proppant pack into permeable consolidated proppant masses to lock the proppant in place during well production.

FIG. 1 illustrates a system 100 for the preparation of an aqueous-based resin treatment fluid as described herein. As shown, the aqueous-based resin treatment fluid may be mixed in mixing equipment 104, such as a jet mixer, re-circulating mixer, or a batch mixer, for example, and then pumped via pumping equipment 106 to the wellbore. In some examples, the mixing equipment 104 and the pumping equipment 106 may be disposed on one or more pump trucks as will be apparent to those of ordinary skill in the art. An aqueous-based resin treatment fluid may be mixed by combing the components of the aqueous-based resin treatment fluid in mixing equipment 104 or in other mixing equipment. Once the aqueous-based resin treatment fluid is prepared, pumping equipment 106 may pump the aqueous-based resin treatment fluid to the wellbore.

Figure 2:
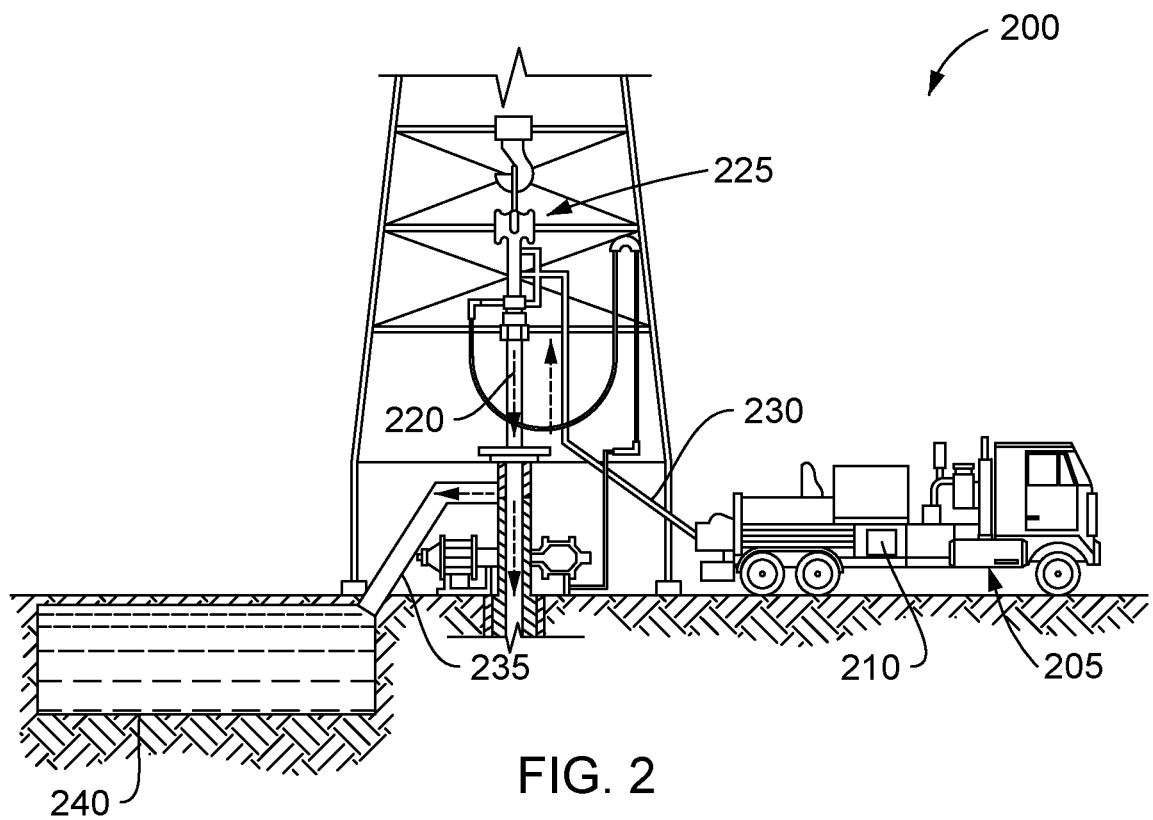
FIG. 2 is a schematic illustration of example surface equipment that may be used in the placement of a resin treatment fluid into a wellbore.

An example of a treatment method using an aqueous-based resin treatment fluid as described above will now be described with reference to FIGS. 2 and 3. FIG. 2 illustrates surface equipment 200 that may be used in the placement of an aqueous-based resin treatment fluid in accordance with certain examples. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 200 may include a pumping unit 205, which may include one or more trucks with mounted pumping and mixing equipment. The pumping unit 205 may include mixing equipment 210 and pumping equipment 215 (e.g., 106 in FIG. 1) as will be apparent to those of ordinary skill in the art. Pumping unit 205, or multiple pumping units 205, may pump aqueous-based resin treatment fluid 220 through a feed pipe 230 and to a pumping head 225 which conveys the aqueous-based resin treatment fluid 220 downhole. Aqueous-based resin treatment fluid 220 may displace other fluids present in the wellbore, such as drilling fluids and spacer fluids, which may exit the wellbore through an annulus and flow through pipe 235 to mud pit 240.

Figure 3:
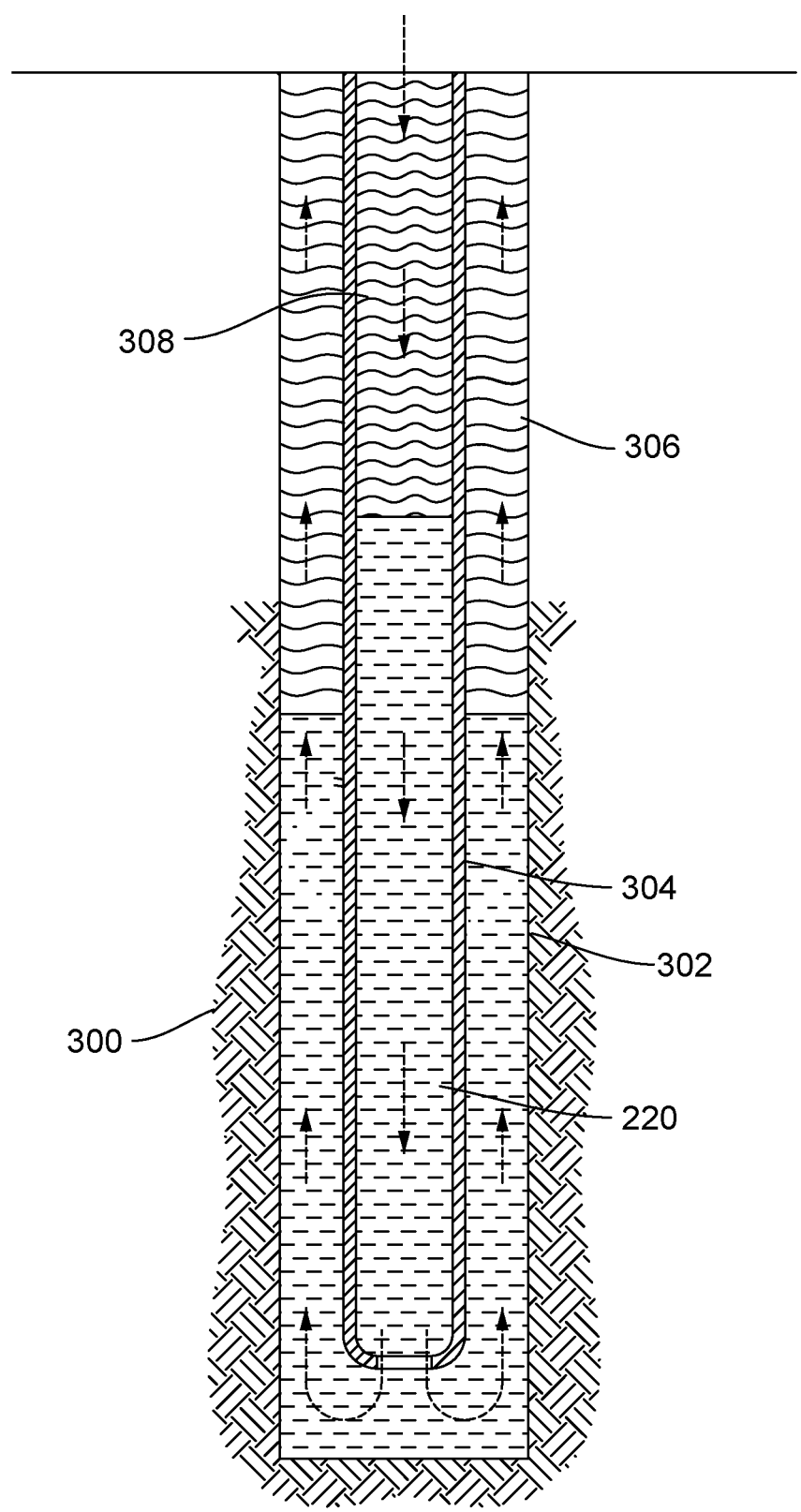
FIG. 3 is a schematic illustration of an example in which a resin treatment fluid is used to create a primary protective sheath.

FIG. 3 generally depicts the placement of aqueous-based resin treatment fluid 220 into a subterranean formation 300 in accordance with example examples. As illustrated, a wellbore 302 may be drilled into the subterranean formation 300. While wellbore 302 is shown extending generally vertically into the subterranean formation 300, the principles described herein are also applicable to wellbores that extend at an angle through the subterranean formation 300, such as horizontal and slanted wellbores. In the illustrated example, a conduit 304 has been inserted into the wellbore 302. A pre-flush fluid 306 may be pumped though conduit 304 to subterranean formation 300 whereby the pre-flush fluid 306 may contact the subterranean formation 300. Pre-flush 306 may include any of the previously described pre-flush fluids including those which contain a brine and a silane. Although FIG. 3 shows an open-hole configuration where the fluids introduced into wellbore 302 can directly contact subterranean formation 300, any wellbore configuration can be utilized including cased wellbores with perforations, for example. Aqueous-based resin treatment fluid 220 may be introduced into conduit 304 to contact subterranean formation 300. After the aqueous-based resin treatment fluid 220, an optional post-flush 308 may be introduced into conduit 304. Post-flush 308 may include any of the previously discussed post-flush fluids.

Accordingly, the present disclosure may provide aqueous-based resin treatment fluids, and more particularly to methods, compositions, and systems using the aqueous-based resin treatment fluids for controlling fines migration, sand production, near wellbore consolidation, and proppant flowback control in low permeability formations and clay-laden formations. The methods and compositions may include any of the various features disclosed herein, including one or more of the following statements.

Statement 1. A method comprising: introducing a treatment fluid into a subterranean formation, the treatment fluid comprising: an aqueous brine; and a hydrolysable resin precursor; allowing the hydrolysable resin precursor to hydrolyze in the subterranean formation to form at least a polymerizable resin precursor monomer; and allowing the polymerizable resin precursor monomer to polymerize to form a polymerized resin in the subterranean formation.

Statement 2. The method of statement 1 wherein the aqueous brine comprises at least one salt selected from the group consisting of, potassium chloride, sodium chloride, ammonium chloride, calcium chloride, calcium bromide, and combinations thereof.

Statement 3. The method of any of statements 1-2 wherein the aqueous brine comprises at least one brine selected from the group consisting of about 7% KCl brine, about 6% NaCl brine, and about 5% $NH_4Cl$ brine.

Statement 4. The method of any of statements 1-3 wherein the hydrolysable resin precursor comprises at least one hydrolysable resin precursor selected from the group consisting of furfuryl acetate, furfuryl methanoate, furfuryl propanoate, furfuryl butanoate, furfuryl pentanoate, furfuryl hexanoate, furfuryl heptanoate, 5-methylfurfuryl acetate, furoic acid, methyl furoate, ethyl furoate, propyl furoate, hexyl furoate, and combinations thereof.

Statement 5. The method of any of statements 1-4 wherein the hydrolysable resin precursor is present in an amount of about 0.1% v/v to about 25% v/v of the treatment fluid.

Statement 6. The method of any of statements 1-5 wherein the treatment fluid further comprises a silane coupling agent.

Statement 7. The method of any of statements 1-6 wherein the treatment fluid further comprises an oil-wetting surfactant.

Statement 8. The method of any of statements 1-7 wherein the hydrolysable resin precursor further hydrolyzes to produce a polymerization initiator.

Statement 9. The method of any of statements 1-8 further comprising introducing a post-flush fluid into subterranean formation, wherein the post-flush fluid further comprises an initiator compound selected from the group consisting of: an organic acid, an inorganic acid, an acid anhydride, a water-soluble multivalent metal salt, and combinations thereof.

Statement 10. The method of any of statements 1-9 wherein the treatment fluid further comprises a surfactant and a foaming gas, wherein the treatment fluid is foamed.

Statement 11. The method of any of statements 1-10 wherein the hydrolysable resin precursor comprises furfuryl acetate in an amount of about 5% v/v to about 25% v/v of the treatment fluid and wherein the treatment fluid further comprises a surfactant and a silane coupling agent.

Statement 12. The method of any of statements 1-11 wherein the subterranean formation has a temperature greater than about 15° C.

Statement 13. A method comprising: introducing a pre-treatment fluid into a subterranean formation, the pre-treatment fluid comprising an aqueous brine and an oil-wetting surfactant; introducing a first resin treatment fluid into the subterranean formation, the first resin treatment fluid comprising: an aqueous brine; and a hydrolysable resin precursor; and allowing the hydrolysable resin precursor to hydrolyze in the subterranean formation to form a polymerizable resin precursor monomer and a polymerization initiator, and allowing the polymerizable resin precursor monomer to polymerize to form a polymerized resin in the subterranean formation.

Statement 14. The method of statement 13 further comprising introducing a second resin treatment fluid into the subterranean formation, the second resin treatment fluid comprising the aqueous brine and the hydrolysable resin precursor, wherein a concentration of the hydrolysable resin precursor in the second resin treatment fluid is about 5 to 10 times greater than a concentration of the hydrolysable resin precursor in the first resin treatment fluid.

Statement 15. The method of any of statements 13-14 wherein the hydrolysable resin precursor comprises at least one hydrolysable resin precursor selected from the group consisting of furfuryl acetate, furfuryl methanoate, furfuryl propanoate, furfuryl butanoate, furfuryl pentanoate, furfuryl hexanoate, furfuryl heptanoate, 5-methylfurfuryl acetate, furoic acid, methyl furoate, ethyl furoate, propyl furoate, hexyl furoate, and combinations thereof.

Statement 16. The method of any of statements 13-15 the first resin treatment fluid and the second resin treatment fluid further comprise a silane coupling agent.

Statement 17. The method of any of statements 13-16 wherein the first resin treatment fluid and the second resin treatment fluid further comprise a surfactant.

Statement 18. The method of any of statements 13-17 wherein the first resin treatment fluid and the second resin treatment fluid are introduced into a proppant pack.

Statement 19. A method comprising: introducing a treatment fluid into an unconsolidated portion of a subterranean formation, the treatment fluid comprising: an aqueous brine; a surfactant; a silane coupling agent; and a hydrolysable resin precursor; allowing the hydrolysable resin precursor to hydrolyze in the subterranean formation to form a polymerizable resin precursor monomer and a polymerization initiator; and allowing the polymerizable resin precursor monomer to polymerize to form a polymerized resin in the subterranean formation to at least partially consolidate the unconsolidated portion of the subterranean formation.

Statement 20. The method of statement 18 wherein the hydrolysable resin precursor comprises at least one hydrolysable resin precursor selected from the group consisting of furfuryl acetate, furfuryl methanoate, furfuryl propanoate, furfuryl butanoate, furfuryl pentanoate, furfuryl hexanoate, furfuryl heptanoate, 5-methylfurfuryl acetate, furoic acid, methyl furoate, ethyl furoate, propyl furoate, hexyl furoate, and combinations thereof.

To facilitate a better understanding of the present invention, the following examples of certain aspects of some embodiments are given. In no way should the following examples be read to limit, or define, the entire scope of the disclosure.

Example 1

In this example, an unconsolidated strength test was performed using four different concentrations of furfuryl acetate. Four test vessels were prepared by packing a sand mixture of 90 grams of 70/170 mesh sand and 10 grams of 325 mesh silica flour into four separate 60 $cm^3$ test vessels. A consolidation treatment was performed under vacuum as follows. First, 75 mL (about 3 pore volumes) of a pre-flush fluid containing 7% KCl brine and 0.25% v/v of a quaternary ammonium surfactant in alcohol carrier fluid was introduced into each test vessel. Next, 100 mL (about 4 pore volumes) of a consolidation mixture containing 7% KCl brine, 0.25% v/v of a quaternary ammonium surfactant in alcohol carrier fluid, 1% N(beta-aminoethyl) gamma-aminopropyltrimethoxy-silane, and furfuryl acetate was introduced into each test vessel. The furfuryl acetate concentrations were 1% v/v, 2% v/v, 5% v/v, and 10% v/v. Each test vessel was tightly sealed and placed in a preheated oven at 200° F. (93.3° C.) for 6 days to cure. After curing, the test vessels were removed from the oven and a consolidated sand pack was removed from each test vessel. An unconfined compressive strength test was performed in accordance with API RP-10B, the results of which are shown in Table 1. A second experiment with 5% v/v Furfuryl Acetate was performed. It was observed that 2% v/v furfuryl acetate and below did not consolidate beyond 5 PSI while 5% v/v and 10% v/v showed appreciable consolidation.

TABLE 1

| | Furfuryl Acetate (% v/v) | | | |
| --- | --- | --- | --- | --- |
| | 1 | 2 | 5 | 10 |
| USC, PSI (kPa) | <5 (34.5) | <5 (34.5) | 528 (3640) 426 (2937) | 604 (4164) |

Example 2

In this example, a fines migration test was performed to test the performance of furfuryl acetate in treating fines-laden sand packs. Brass test cells were prepared as follows: a top plunger followed by a 40-mesh screen followed by 20/40 mesh sand followed by a fines-laden sand pack followed by 40/60 mesh sand followed by an 80-mesh screen followed by a bottom plunger.

A control test cell was prepared with the fines-laden sand pack consisting of 15% w/w 325 mesh silica flour with 85% w/w 20/40 mesh sand. A pre-flush containing 150 mL (about 3 pore volumes) of 7% KCl brine and 0.25% v/v of a quaternary ammonium surfactant in alcohol carrier fluid was introduced into the control test cell.

Two experimental test cells were prepared with the fines-laden sand pack consisting of 25% w/w 325 mesh silica flour with 75% w/w 20/40 mesh sand. A pre-flush containing 150 mL (about 3 pore volumes) of 7% KCl brine and 0.25% v/v of a quaternary ammonium surfactant in alcohol carrier fluid was introduced into the experimental test cells. Next, 200 mL (about 4 pore volumes) of a consolidation mixture containing 7% KCl brine, 0.25% v/v of a quaternary ammonium surfactant in alcohol carrier fluid, 1% N(beta-aminoethyl) gamma-aminopropyltrimethoxy-silane, and furfuryl acetate at 1% v/v for the first cell and 2% w/w for the second cell. The two experimental test cells were placed in a preheated oven at 200° F. (93.3° C.) for 3 days to cure.

A flowback test was performed for each of the control, first, and second experimental test cell by flowing a 7% KCl brine as a simulated production fluid in the reverse direction of the fluid introduction used to prepare the cells. The flowback test was performed at increasing flow rates until 100 mL of effluent volume was captured for each flow rate. A turbidity measurement was taken after 100 mL of effluent was captured using a nephelometer and is reported in Table 2, 3, and 4 in Nephelometric Turbidity Units (NTU). Table 2 shows the results from the control (i.e., without furfuryl acetate), Table 3 shows the results from 1% v/v furfuryl acetate, and Table 4 shows the results from 2% v/v furfuryl acetate. It was observed that the samples with furfuryl acetate greatly reduced the fines migration from the fines-laden sand pack even as the control contained a smaller amount of silica flour than the experimental cells.

TABLE 2

| mL/min | NTU's |
| --- | --- |
| 10 | 6.54 |
| 20 | 24.1 |
| 40 | 233 |
| 80 | 984 |
| 160 | 3520 |
| 320 | 2810 |

TABLE 3

| mL/min | NTU's |
| --- | --- |
| DI Water | 0.71 |
| 10 | 1.85 |
| 20 | 1.57 |
| 40 | 2.46 |
| 80 | 2.91 |
| 160 | 11.1 |
| 320 | 12 |

TABLE 4

| mL/min | NTU's |
| --- | --- |
| 10 | 0.67 |
| 20 | 4.06 |
| 40 | 3.48 |
| 80 | 5.12 |
| 160 | 19.2 |
| 320 | 14.5 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method comprising:
   introducing a treatment fluid into a subterranean formation, the treatment fluid comprising:
   an aqueous brine; and
   a hydrolysable resin precursor comprising furfuryl acetate, wherein the furfuryl acetate is present in an amount between 0.1% and 15% by volume of the treatment fluid;
   allowing the hydrolysable resin precursor to hydrolyze in the subterranean formation to form at least a polymerizable resin precursor monomer; and
   allowing the polymerizable resin precursor monomer to polymerize to form a polymerized resin in the subterranean formation, wherein the polymerized resin comprises poly(furfuryl alcohol) resin.

2. The method of claim 1 wherein the aqueous brine comprises at least one salt selected from the group consisting of, potassium chloride, sodium chloride, ammonium chloride, calcium chloride, calcium bromide, and combinations thereof.

3. The method of claim 1 wherein the aqueous brine comprises at least one brine selected from the group consisting of about 7% KCl brine, about 6% NaCl brine, and about 5% NH$_4$Cl brine.

4. The method of claim 1 wherein the hydrolysable resin precursor further comprises at least one additional hydrolysable resin precursor selected from the group consisting of furfuryl methanoate, furfuryl propanoate, furfuryl butanoate, furfuryl pentanoate, furfuryl hexanoate, furfuryl heptanoate, 5-methylfurfuryl acetate, furoic acid, methyl furoate, ethyl furoate, propyl furoate, hexyl furoate, and combinations thereof.

5. The method of claim 1 wherein the hydrolysable resin precursor further hydrolyzes to produce one or more polymerization initiators.

6. The method of claim 1, further comprising introducing a post-flush fluid into the subterranean formation wherein the post-flush fluid further comprises at least one initiator compound selected from the group consisting of: an inorganic acid, an acid anhydride, a water-soluble multivalent metal salt, and combinations thereof.

7. The method of claim 1 wherein the treatment fluid further comprises a foaming gas, wherein the treatment fluid is foamed.

8. The method of claim 1 wherein the subterranean formation has a temperature greater than about 15° C.

9. A method comprising:
   introducing a pre-treatment fluid into a subterranean formation, the pre-treatment fluid comprising an aqueous brine and an oil-wetting surfactant;
   introducing a first resin treatment fluid into the subterranean formation, the first resin treatment fluid comprising:
   an aqueous brine; and
   a hydrolysable resin precursor comprising furfuryl acetate, wherein the furfuryl acetate is present in an amount between 0.1% and 15% by volume of the first resin treatment fluid;
   allowing the hydrolysable resin precursor to hydrolyze in the subterranean formation to form a polymerizable resin precursor monomer and a polymerization initiator, and allowing the polymerizable resin precursor monomer to polymerize to form a polymerized resin in the subterranean formation, wherein the polymerized resin comprises poly(furfuryl alcohol) resin.

10. The method of claim 9 further comprising introducing a second resin treatment fluid into the subterranean formation, the second resin treatment fluid comprising the aqueous brine and the hydrolysable resin precursor, wherein a concentration of the hydrolysable resin precursor in the second resin treatment fluid is about 5 to 10 times greater than a concentration of the hydrolysable resin precursor in the first resin treatment fluid.

11. The method of claim 10 wherein the hydrolysable resin precursor comprises at least one additional hydrolysable resin precursor selected from the group consisting of furfuryl methanoate, furfuryl propanoate, furfuryl butanoate, furfuryl pentanoate, furfuryl hexanoate, furfuryl heptanoate, 5-methylfurfuryl acetate, furoic acid, methyl furoate, ethyl furoate, propyl furoate, hexyl furoate, and combinations thereof.

12. The method of claim 10 the first resin treatment fluid and the second resin treatment fluid further comprise a silane coupling agent.

13. The method of claim 10 wherein the first resin treatment fluid and the second resin treatment fluid further comprise a surfactant.

14. The method of claim 10 wherein the first resin treatment fluid and the second resin treatment fluid are introduced into a proppant pack.

15. A method comprising:
    introducing a treatment fluid into an unconsolidated portion of a subterranean formation, the treatment fluid comprising:
    an aqueous brine;
    a surfactant;
    a silane coupling agent; and
    a hydrolysable resin precursor comprising furfuryl acetate, wherein the furfuryl acetate is present in an amount between 0.1% and 15% by volume of the treatment fluid;
    allowing the hydrolysable resin precursor to hydrolyze in the subterranean formation to form a polymerizable resin precursor monomer and a polymerization initiator; and
    allowing the polymerizable resin precursor monomer to polymerize to form a polymerized resin in the subterranean formation to at least partially consolidate the unconsolidated portion of the subterranean formation.

16. The method of claim 14 wherein the hydrolysable resin precursor further comprises at least one additional hydrolysable resin precursor selected from the group consisting of furfuryl methanoate, furfuryl propanoate, furfuryl butanoate, furfuryl pentanoate, furfuryl hexanoate, furfuryl heptanoate, 5-methylfurfuryl acetate, furoic acid, methyl furoate, ethyl furoate, propyl furoate, hexyl furoate, and combinations thereof.

17. The method of claim 1, further comprising introducing a first flush fluid into the subterranean formation before introducing the treatment fluid, wherein a concentration of the furfuryl acetate in the treatment fluid is 5 to 10 times greater than that of the first flush fluid.

18. The method of claim 17, wherein the first flush fluid also comprises a foam generating surfactant and a foaming gas.

19. The method of claim 1, wherein the treatment fluid is foamed and further comprises:

an oil-wetting surfactant;
a silane coupling agent;
a foam generating surfactant; and
a foaming gas;
wherein the method further comprises introducing a post-flush fluid into the subterranean formation to drive the second treatment fluid deeper into the formation, the post-treatment fluid comprising aqueous brine and an organic acid.

* * * * *